United States Patent [19]
Martin et al.

[11] Patent Number: 5,240,454
[45] Date of Patent: Aug. 31, 1993

[54] POULTRY LEG PROCESSOR

[75] Inventors: Eugene Martin, Denver; Ken Hackman, Ephrata, both of Pa.

[73] Assignee: Foodcraft Holdings Inc., Wilmington, Del.

[21] Appl. No.: 646,949

[22] Filed: Jan. 30, 1991

[51] Int. Cl.⁵ .............................. A23C 1/00
[52] U.S. Cl. ...................... 452/182; 452/184
[58] Field of Search ............ 452/182, 184, 177

[56] References Cited

U.S. PATENT DOCUMENTS

| | | |
|---|---|---|
| 4,215,654 | 8/1980 | Parker, Jr. |
| 4,570,295 | 2/1986 | Van Mil ........................ 452/182 |
| 4,574,428 | 3/1986 | Meyn ............................ 452/182 |
| 4,658,476 | 4/1987 | van den Brink. |
| 4,709,448 | 12/1987 | McGuire et al. ................. 452/182 |
| 4,756,056 | 7/1988 | Innes et al. ..................... 452/182 |
| 4,791,704 | 1/1988 | Chapman ....................... 452/182 |

Primary Examiner—Bruce M. Kisliuk
Assistant Examiner—Lawrence Cruz
Attorney, Agent, or Firm—Shoemaker and Mattare, Ltd.

[57] ABSTRACT

A chicken leg processor includes a transfer device for removing the lower portion of halved birds from a shackle conveyor, and delivering them to a line along which the hip joints are partially cut through. While the legs remain suspended from the line, the back is then inverted, and is moved at a speed different from the legs, to remove the legs from the back. Thereafter, the legs are separated into thighs and drumsticks.

9 Claims, 9 Drawing Sheets 5,240,454

POULTRY LEG PROCESSOR

BACKGROUND OF THE INVENTION

This invention relates to the art of butchering, and more particularly to a method and apparatus for processing the legs of chickens and other poultry.

There is interest in automating various aspects of poultry processing that were previously done by hand, and in improving existing equipment, both in terms of product quality and processing speed.

In the field of poultry processing, severing legs from the body of the bird and removing the drumstick from the thigh are two chores that have been difficult to do well automatically, owing to difficult and varying geometry of these portions.

SUMMARY OF THE INVENTION

It is an object of the invention to fully automate the processing of chicken legs. A related object is to improve the quality of machine-cut poultry legs.

These and other objects of the invention are met by a poultry leg processing machine, having means for suspending a series of saddles by both their hocks, the suspending means defining a flow path, and serving to hold the hocks apart in a direction transverse to the flowpath. Augers transport the saddles along the path at a predetermined speed, over means for engaging the crotch between the legs and for locating the hip joint. A first blade on either side of the engaging means, downstream of the locating means and in alignment therewith, severs skin adjacent the joint, and a second blade on either side of the engaging means, downstream of the locating means and in alignment therewith, severs the tendons in the hip joint. The saddle is inverted while the feet remain engaged by the suspending means, and then the legs are torn from the back and divided into thighs and drumsticks.

BRIEF DESCRIPTION OF THE DRAWINGS

In the accompanying drawings.

DESCRIPTION OF THE PREFERRED EMBODIMENT

Figure 1:
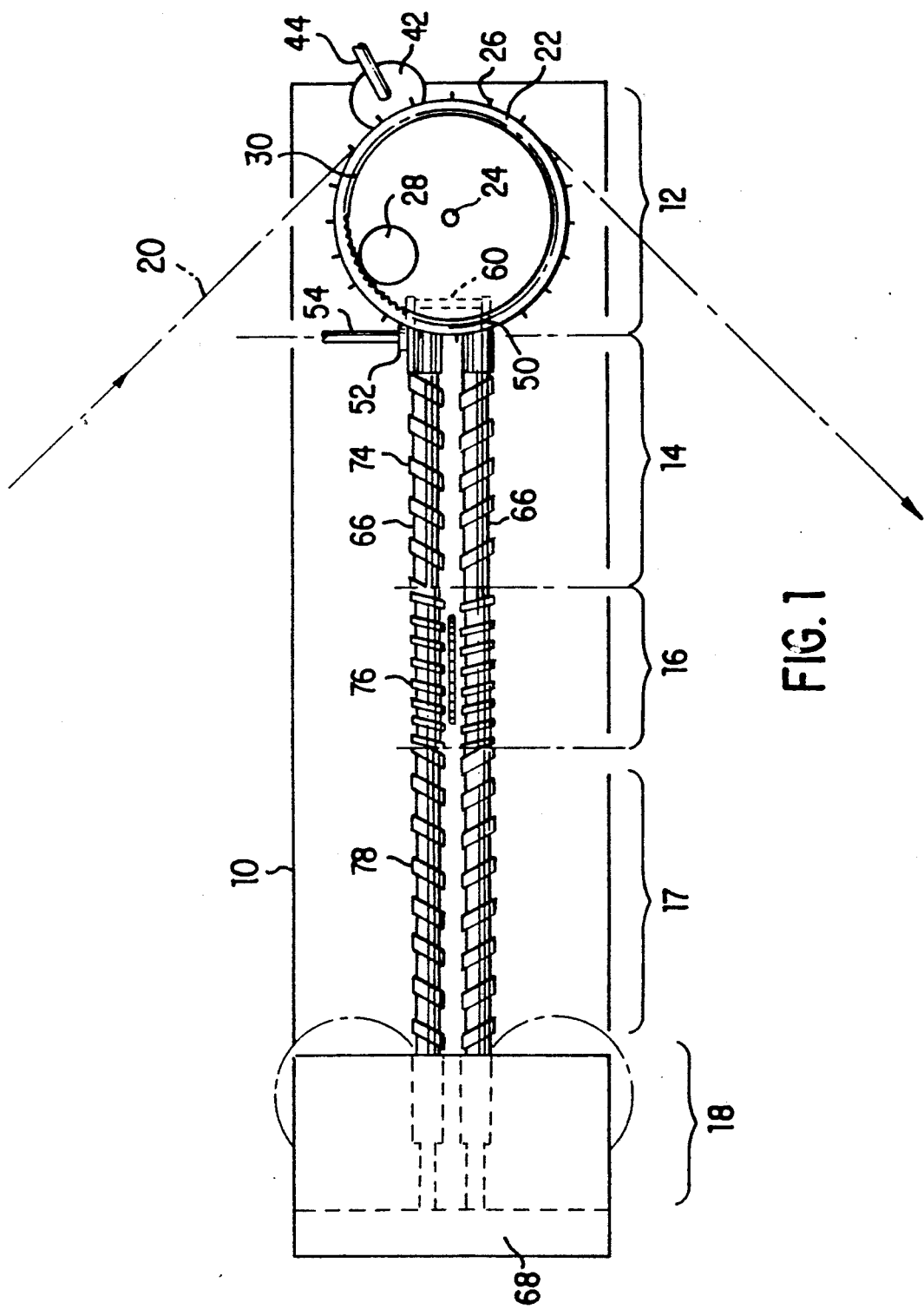
FIG. 1 is a top plan view of an apparatus embodying the invention.

FIG. 1 provides an overall plan view of an apparatus embodying the invention. The apparatus is very complex, so in this view, and throughout the drawings, detail not important to an understanding of the invention has been omitted so that the invention can be clearly explained.

The apparatus comprises a frame 10, shown diagrammatically in FIG. 1, which supports the subassemblies of the invention. Breaking the invention down to functional components, there are, in sequence, a transfer unit 12, a nicking unit 14, an inverting unit 16, a tearing unit 17, and a splitting unit 18. The location of each unit is indicated generally in FIG. 1. Arrows denote the direction of product flow through the apparatus.

The transfer unit comprises a conventional shackle conveyor 20 running along a predetermined horizontal path from a location at which birds have been slaughtered, plucked, gutted, and divided into halves. The upper half of each bird (breasts, wings, upper portion of back) has been directed elsewhere, leaving the whole legs interconnected by lower portion of back (together referred to hereafter by the accepted term "saddle") suspended from the shackles by its hocks (the enlarged lower portions corresponding to the human ankle). The apparatus then separates the legs from the back, and finally severs the drumsticks from the thighs. (The severing portion of the apparatus is not new, having been previously patented by the present applicant: nevertheless, it is described herein to give a whole picture of the apparatus.)

When it reaches the present apparatus, the shackle conveyor path passes around a portion (e.g., 90°) of the periphery of a large sprocket 22, which is formed from a disc of polymeric material such as ultra-high molecular weight polyethylene, mounted on a vertical main axle 24 supported at either end by bearings (not shown) connected to the frame. The disc has studs 26 protruding from its periphery at intervals corresponding to the pitch of the conveyor, the studs being designed to penetrate openings existing in the conveyor, to interconnect the apparatus and the shackle line. The apparatus could derive its power from the shackle line in this way, but we prefer to provide the apparatus with its own motor 28, so that the conveyor line is not greatly loaded when the apparatus is added to it. When the apparatus is self-powered, the studs serve primarily to maintain proper registration between the shackle conveyor and the disc. The motor 28 is a standard hydraulically-driven unit mounted atop the frame on an axis parallel to the main axle, and drives a large polymeric gear 30 atop the disc through a reduction gearset (not shown). Bearings and other details of these components have been omitted from the drawings, for clarity.

A blunt-edged disc 32 mounted on the axle slightly below the sprocket 22 keeps the individual shackles 33 of conveyor 20 vertical as they pass around the unit. Below this disc, at the level of the hocks in the shackles, there is a peripherally slotted disc 34 whose lower peripheral edge 36 is undercut at 38 for a purpose described below. The slots 40 are provided in uniformly spaced pairs, corresponding in spacing to the spacing of the shackles, and have a width (about ⅜ inch) which is greater than the leg bones, but narrower than the hocks, whereby once the legs are transferred into the slots, the saddles remain supported by the hocks.

The undercut 38 (see FIG. 2) accommodates an arcuate guide bar 41 whose function is to keep the hocks in the slots of the wheel after they have been transferred. The guide bar starts outside the outer diameter of the slotted disc just upstream of the point of tangency between the shackle conveyor and the disc, but otherwise generally lies within the undercut.

Figure 2:
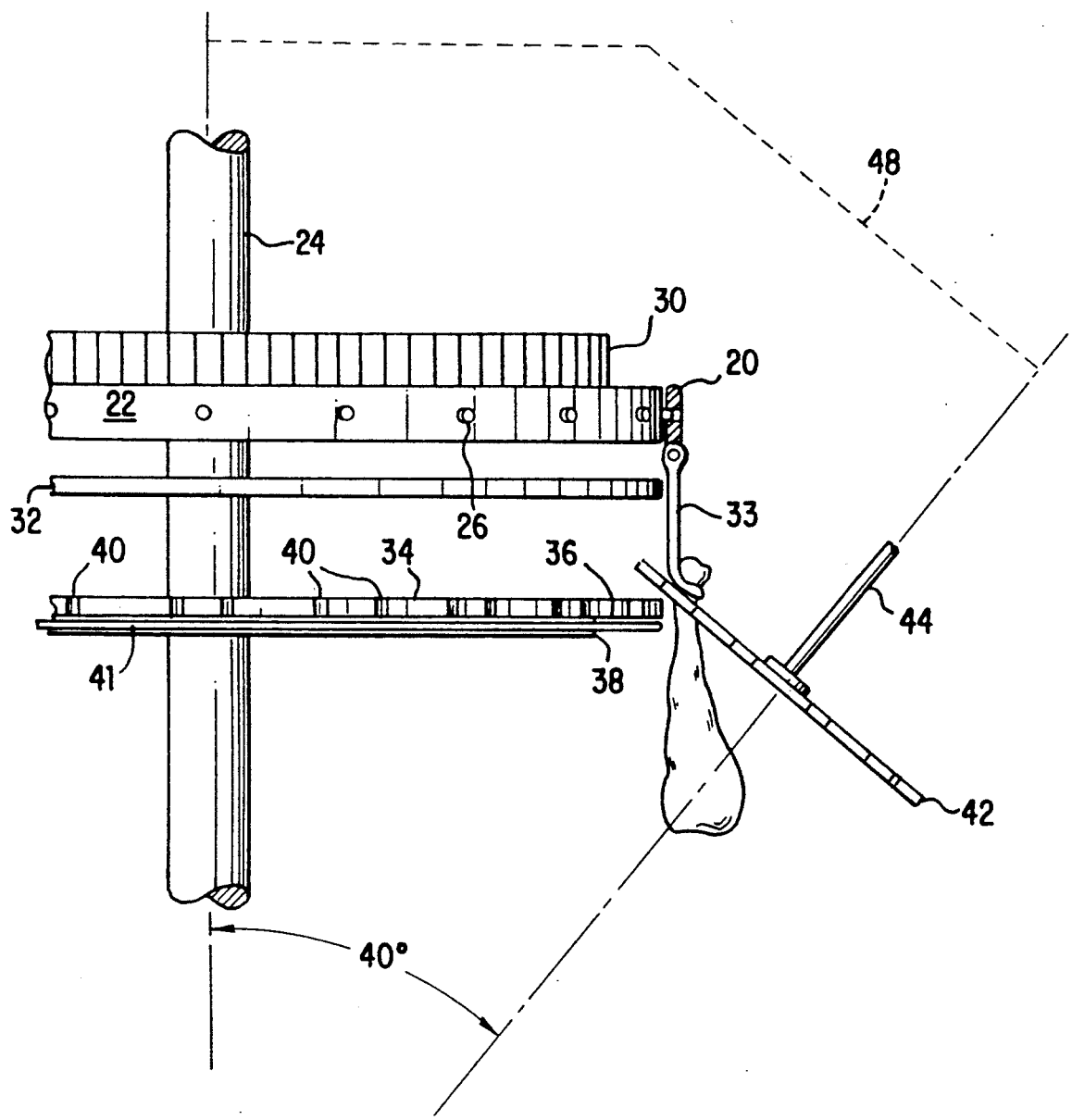
FIG. 2 is a side elevation of a transfer disc shown in FIG. 1.

The shackles are designed, of course, to hold the hocks securely, and prevent strictly lateral withdrawal. The hocks cannot be simply pushed laterally out of the shackles; rather, it is necessary to lift them somewhat first. To do this, the apparatus includes a transfer wheel 42, illustrated in FIGS. 2 and 3. FIG. 2 is a view perpendicular to a plane containing both axes, looking in the upstream direction. Only the edge of the transfer disc is seen in this view, since the shaft 44 which supports the disc lies in a radial plane of the axle, and therefore within the plane of the drawing. The shaft 44 is inclined outwardly with respect to the axle about 40°, to provide both lifting and lateral motion, and intersects the vertical plane of the shackle conveyor below the level of the hocks. The lower surface of the transfer disc just clears the upper edge of the slotted disc, which it overlaps by about an inch.

Figure 3:
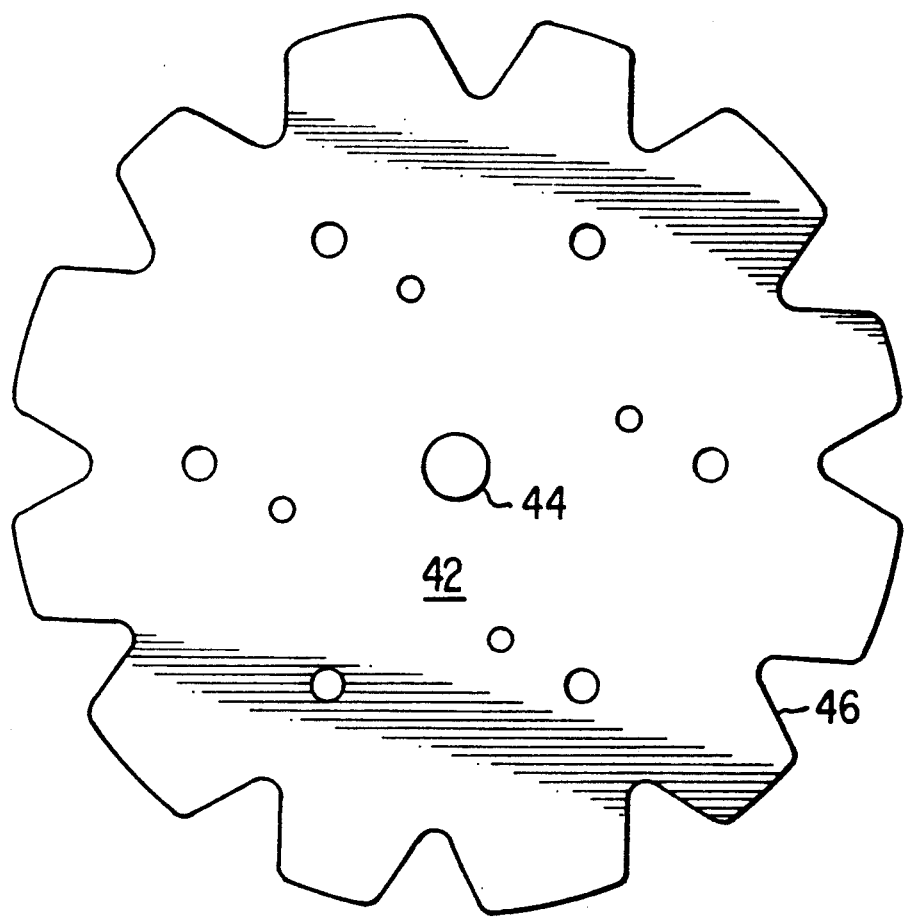
FIG. 3 is an oblique view of the transfer disc of FIG. 2, taken along its axis of rotation.
Figure 4B:
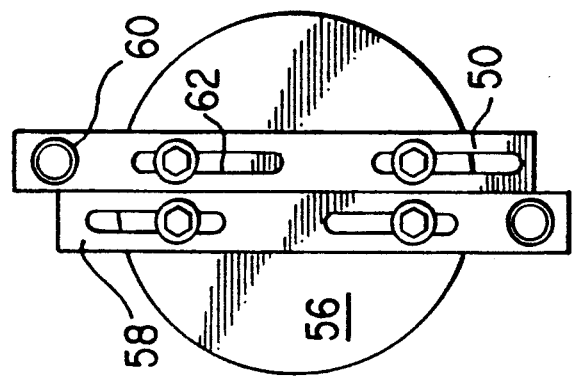
FIG. 4b is an end view thereof.
Figure 4A:
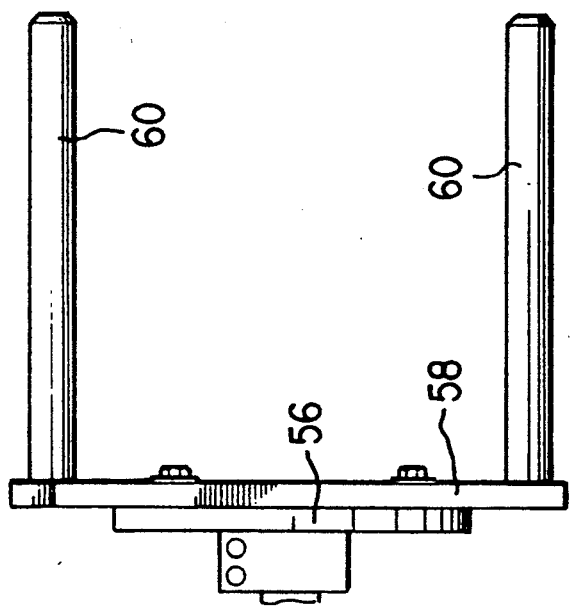
FIG. 4a is a side elevation of a transfer paddle appearing in FIG. 1.

FIG. 3 shows the configuration of the transfer disc, which includes plural (ten) equally spaced peripheral indentations 46, each the shape of a 60° "V", with generous radiuses and fillets. The spacing of the indentations equals that of the slots, the disc shaft being driven at a speed sufficient to make the peripheral speeds of the slotted disc and the transfer disc approximately equal. Power is derived from a power take-off 48, represented diagrammatically by broken lines, which mechanically interconnects the two discs.

Saddles which have thus been loaded into the slotted disc are carried by it to an offloading point 50 shown in FIG. 1. The guide rod terminates just upstream of this point, so that the hocks can be removed from the slots. Directly below the offloading point, there is a paddle device 52 which kicks each saddle laterally outward, by striking the thighs. The paddle device is mounted on a horizontal shaft 54 extending laterally of the machine (i.e., horizontally, and perpendicular to the direction of subsequent product flow), the shaft being driven from the main motor by a second mechanical power take-off, again shown diagrammatically. A disc 56 is attached to the inboard end of the shaft, and a pair of L-shaped arms 58, each comprising a slotted bar with a cylindrical rod 60 welded thereto, are bolted to the disc. The slots 62 permit adjustment of the diameter of the paddle path, for different situations. The paddle, like all other moving parts of this invention, is driven continuously in synchronization with the other parts through a power take-off. Motion of the paddle is synchronized with respect to the slotted disc so that it strikes the legs just as the hocks come into registration with respective spaces formed between two pairs of identical, horizontal guide rods 64 that extend away from the slotted disc on either side of a vertical center plane "P" containing the main axle axis. The apparatus is substantially symmetrical on either side of the center plane, except as previously noted.

Within each pair of guide rods, the spacing between rods is sufficient to pass the leg bone, but not the hock; thus, these rods support the hocks during the nicking, inverting and tearing steps that follow.

Figure 7:
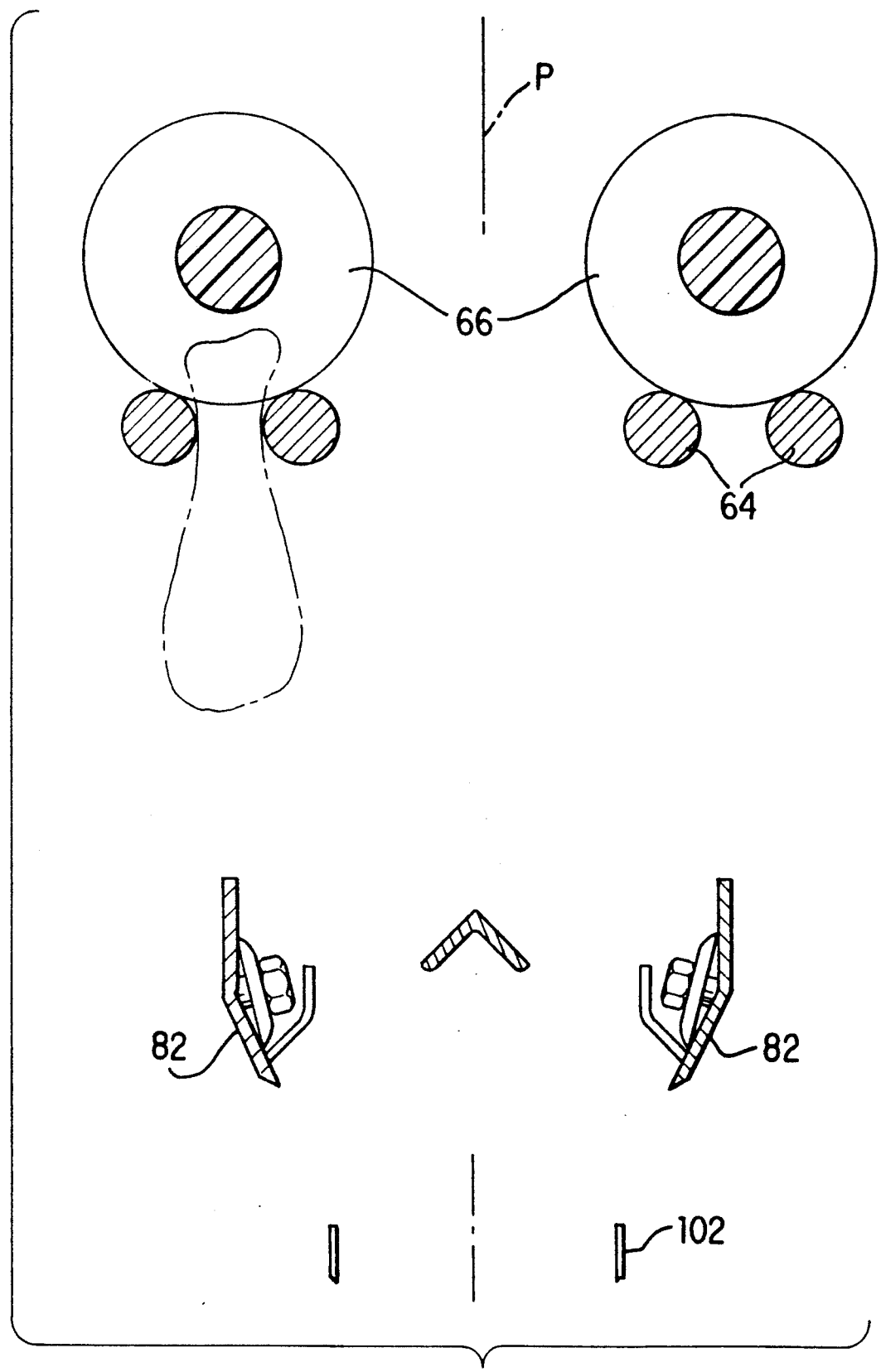
FIGS. 7 and 8 are sectional views taken along the lines 7—7 and 8—8 in FIGS. 5 and 6, respectively.
Figure 8:
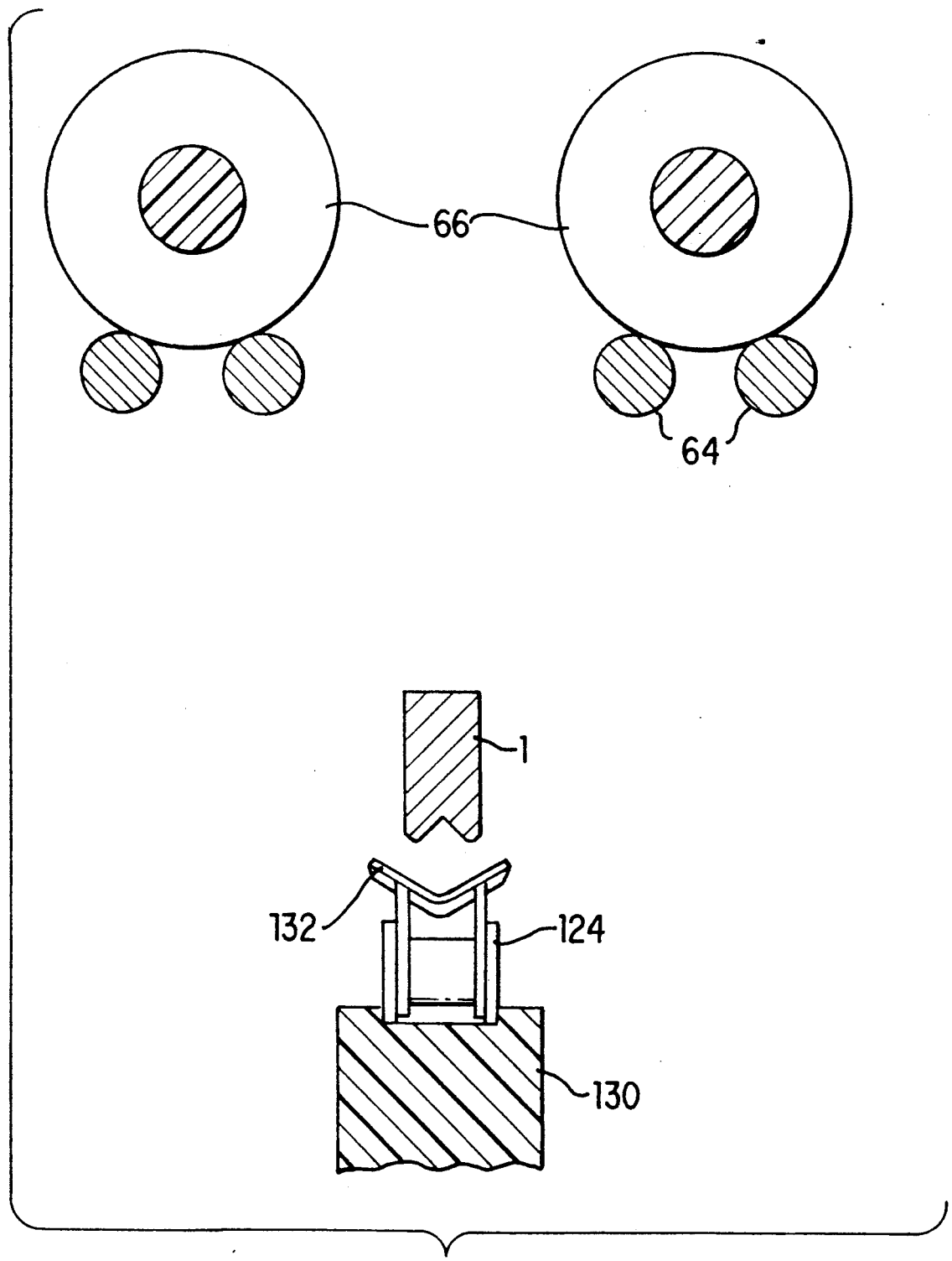
Figure 9:
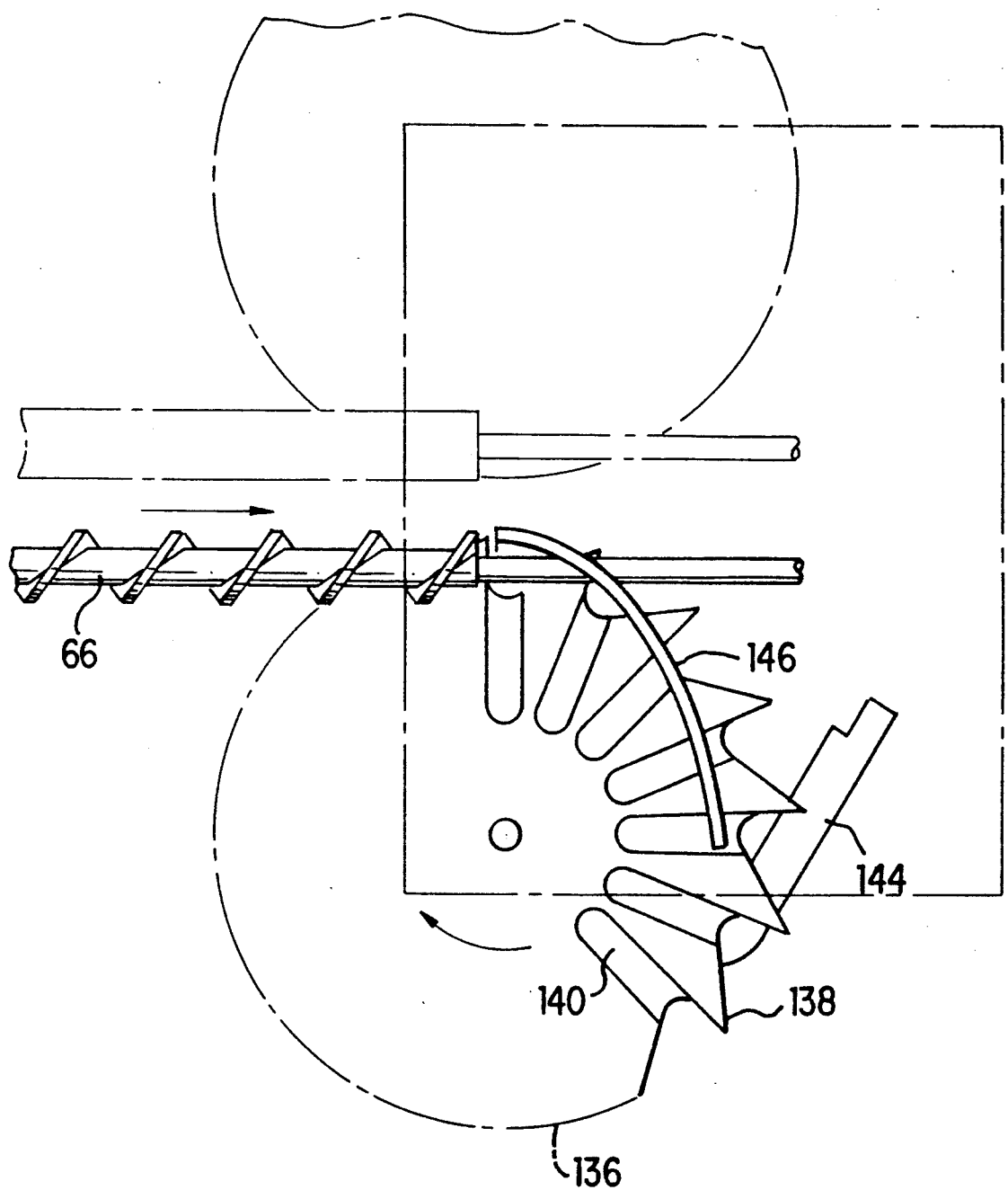
FIG. 9 is a top plan view of a portion of the apparatus which severs drumsticks from thighs.

The hocks are engaged from behind by flutes on respective polymeric augers 66 disposed on horizontal axes which parallel the guide rods, and lie above and midway between them. The augers can be seen clearly in FIGS. 1, 5 and 6. They are mirror images of one another. Looking in the direction of the views of FIGS. 7 and 8, that is, in the downstream direction, the auger on the left has right-hand threads, and is rotated counter-clockwise. Its counterpart has threads of opposite hand, and rotates in the opposite direction, at the same speed. Rotation is imparted to the augers by a transfer case 68 at the far downstream end of the machine, which is driven by a third power take-off, again not shown, while the upstream ends are supported in fixed bearings. We prefer to place a pressure bar 72 (FIG. 5) over each auger at its midpoint, to prevent the auger from flexing upward, out of contact with the hocks.

Figure 5:
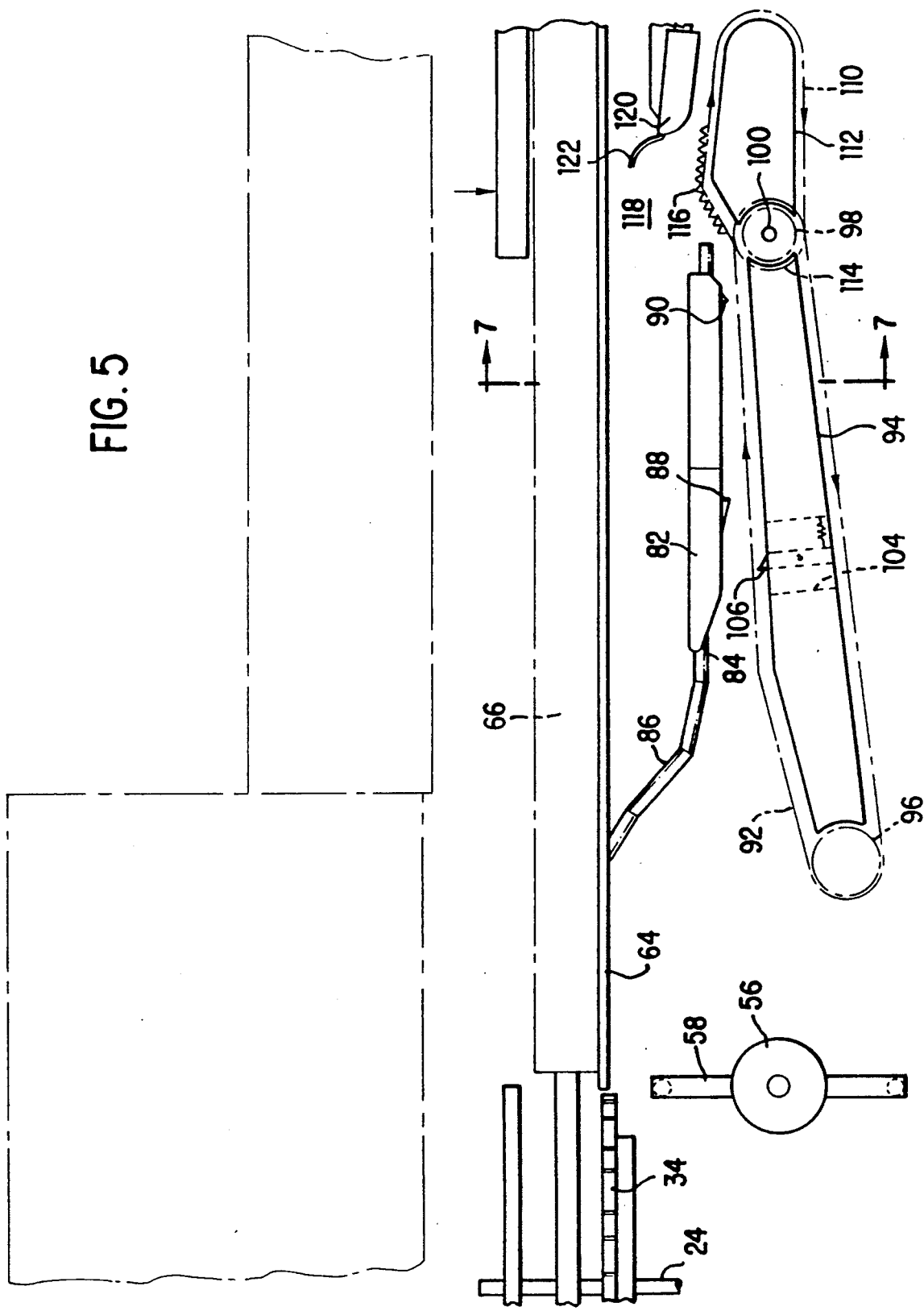
FIGS. 5 and 6 are side elevations of successive portions of the apparatus.
Figure 6:
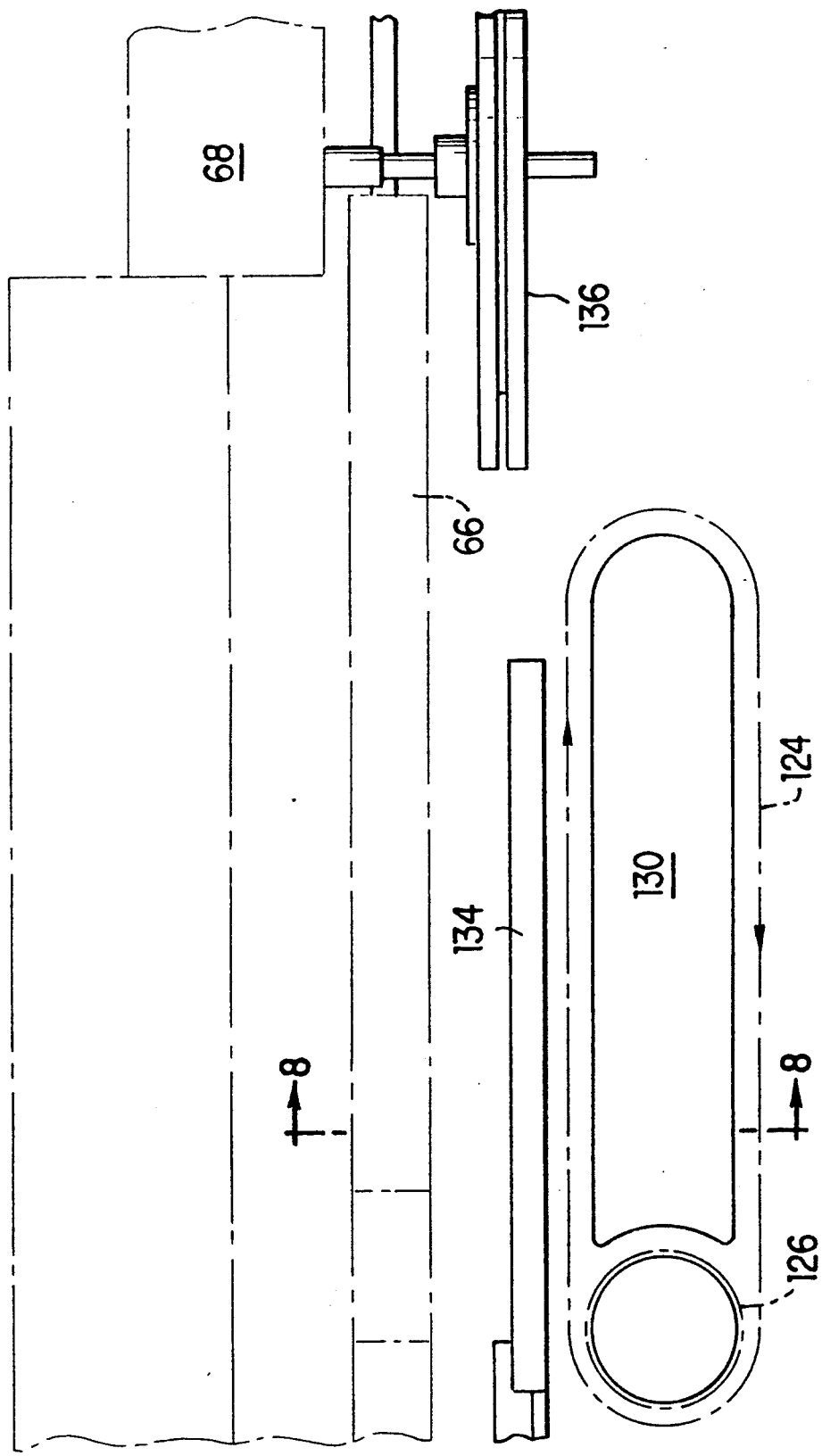

As can be seen in FIGS. 5 and 6, the augers have uniform diameter, but changing pitch. The variations in pitch define three distinct segments 74, 76 and 78 corresponding to the nicking, inverting and tearing sections of the apparatus. The first two of those units are shown in FIG. 5; the tearing unit is illustrated in FIG. 6. The auger segment in the inverting unit has a pitch about half that of the other two segments, for a purpose described later.

As shown in FIG. 5, the nicking unit includes a stationary structure 80 mounted below the guide rods. "Stationary" means that a particular component does not ordinarily move, but does not imply that it may not be adjusted. In fact, every guide and conveyor in the apparatus is provided with mountings that permit some degree of adjustability, so that operation of the apparatus may be optimized for different bird sizes and other changing parameters. The adjustment mechanisms are not shown in the drawings; their design would be within the ability of a person of ordinary skill in this field.

The stationary structure comprises two spaced contoured plates 82, whose shapes are like the sides of a rowboat, having a leading, rounded edge 84 which engages between the legs, and above the back, as the saddle is carried along, upside-down, by the augers. Each leading edge has a small-diameter guide rod 86 affixed to it, to locate the hip joint properly. Just downstream of the terminus of each guide rod, a downwardly protruding skin nicking blade 88 is affixed to each plate, and at the far downstream end of the blade is a tendon cutting blade 90 is similarly supported.

A first chain conveyor 92 is disposed just below the stationary structure. This conveyor actually includes two three-quarter inch pitch chains, spaced about an inch apart, each running around a polymeric guide block 94, and entrained on sprockets 96, 98 at either end of the guide block. The upstream sprockets 96 are idlers, while those at the downstream end are mounted on a horizontal, transverse shaft 100 driven by a power take-off (not shown). To engage the backs, and push them along the structure at the same speed as the hocks, the chains are provided with vertically protruding tabs 102 at regular intervals equal to the spacing between saddles, about every eight inches. In the preferred embodiment, this is twice the lead of the auger at this point.

The guide block 94 is provided with a vertical slot or recess 104, in which a third pair of blades 106 are mounted. These blades, only about a half inch apart, and straddling the center plane of the device, are mounted on a pivot shaft 108 within the guide block, and are spring-biased toward a vertical position, at which they are stopped. The spring bias permits the blades to move rearwardly when bone is encountered in the back, but ordinarily keeps the blades upright. The purpose of these blades is to ensure that skin does not continue to interconnect the legs after they are removed from the back, and to give the product good appearance.

The inverting unit, shown in the left hand side of FIG. 5, includes a single chain 110 running on a second polymeric guide bar 112. The chain runs in a vertical plane, between the two chains 92, around a sprocket 114 somewhat larger that those of its neighbor, on the same shaft. Thus, this chain runs in the same direction as the nicking conveyor chains, but at a greater speed. The downstream end of its guide bar is rounded, so that no idler sprocket is required. This chain has a smaller pitch than do the neighboring chains, and each link of the chain has a sharp, outwardly extending, triangular tooth 116.

Above the upstream end of the inverter chain conveyor, there is an open space 118, to permit the back to flip as described below. Above the downstream end of the chain 110 is a stationary guide 120 whose cross-section is an inverted "V". This structure engages the backbone, to ensure that the back stays centered over the chain. The guide has rounded leading edges and a pair of arcuate rods 122 which guide the back from the open space into proper position.

Turning now to FIG. 6, the tearing unit has its own chain conveyor as well, comprising a single chain 124 running on a driven sprocket 126. The chain is supported, over the upper portion of its path, by a polymeric guide bar 130 whose upper edge is slotted to receive the chain. Every other link of the chain has an outwardly extending flight 132, comprising an erect "V" shaped member whose leading (downstream) edge is rounded, and which is tapered in the downstream direction. The series of flights present a sawtooth profile which prevents backs from being pulled along by their legs, differential speed being critical to the operation of this unit. The chain in this section moves more slowly than do the hocks, as described further below.

An inverted "V" guide bar 134 overlies this part of the apparatus, again to center the back while the legs are being removed from it.

The last unit in the apparatus is the splitter, which processes the legs themselves, dividing the thighs and drumsticks. This part of the apparatus is the subject of U.S. Pat. No. 4,480,353, the disclosure of which is incorporated herein by reference. Briefly, the splitter comprises two sprockets 136, one supported on either side of the machine on its own vertical axis. The sprocket has sixteen identical teeth 138, raked forward, protruding between radially extending recesses 140 about ⅜' deep. A deep, narrow slot 142 is cut around the circumference of the sprocket, to accept a stationary, oblique knife 144. As the legs exit the tearing unit, they are deposited between the teeth of this unit, and the hocks are freed by termination of the guide bars, whereupon arcuate guide bars 146 fold the legs over the top of the sprocket, into respective ones of the recesses 140, and the thighs are correspondingly folded into the recesses on the bottom of the sprocket. This positions the knee joint for cutting by the stationary blade. Subsequently, the parts are freed, and delivered to separate receptacles or conveyors, not shown.

In operation, a series of saddles approach the apparatus, having been placed in the shackles so that the tails are on the side away from the machine. As they pass over the transfer wheel, the hocks are lifted from the shackles, and deposited into the slots of the slotted wheel. The wheel carries the saddles to the unloading position, where the paddle drives each hock out of its slot, and into the space between the guide rails. The rails subsequently support the product, as the hocks are driven along by the rotating augers.

The backs, now tail downstream, engage under the stationary structure, whose knives first nick the skin adjacent the hip joint, and then sever the tendons in the joint, while the pivoting knife scores the skin on the bottom of the back, down to the bone.

Next, as the saddles enter the inverting section, the hocks are slowed by the reduced pitch of the augers in that location, while the backs, driven by the aggressive toothing on the inverter conveyor, are sped up by the increased chain speed. Because the backs are unrestrained above at this point, they flip over backward, so that now the tails point upstream. This movement stresses the hip joints, and in the inverted position, the legs can be torn from the back. The back is again restrained from above, as the saddle proceeds to the tearing section.

In the tearing section, there is also a speed differential, but now the chain conveyor moves more slowly than do the hocks. As the sawtooth profile of the chain prevents the backs from following the legs at their own speed, the hip joint is eventually destroyed, and the backs fall into a bin or conveyor (not shown), while the whole legs remain suspended from the guide rails, and continue to be moved by the augers. At the end of the apparatus, the legs are freed from the guide rails, and the drumsticks and thighs are severed as described above.

An advantage of this apparatus is that it can easily be modified to produce a so-called "school lunch" cut, wherein the legs are not separated from the back; rather, the back is halved, resulting in two pieces each comprising one whole leg and half of the back. The modification involves removing the blades described above, and substituting a single blade extending in the center plane of the apparatus.

Inasmuch as the invention is subject to this and other modifications and variations, it is intended that the foregoing description and the accompanying drawings shall be interpreted as illustrative of only one form of the invention, whose scope is to be measured by the following claims.

I claim:

1. A device for transferring poultry hocks for a first shackle conveyor, supporting the hocks in a vertical plane, to a second conveyor, comprising:
   means for both lifting the hocks out of the shackles and pushing them laterally away from the conveyor, said means including a rotatable disc supported on an axis oblique to said vertical plane and intersecting said plane below the level of the hocks, the disc being situated so that its uppermost peripheral portion crosses beneath the path of the hocks.

2. The invention of claim 1, wherein the disc has a circumferentially spaced array of indentations around its periphery, corresponding to the spacing of the hocks in the shackle conveyor.

3. The invention of claim 2, wherein each of said indentations has substantially the shape of a 60° vee.

4. The invention of claim 1, further comprising means for turning the transfer disc on its axis at a peripheral speed about equal to the speed of the shackle conveyor.

5. The invention of claim 1, wherein said second conveyor is a slotted wheel mounted on a vertical axis of rotation.

6. The invention of claim 5, further comprising means for synchronizing movement of said first and second conveyors.

7. The invention of claim 6, wherein said synchronizing means is a series of pins protruding from the periphery of said wheel into engagement with correspondingly spaced structure on said first shackle conveyor.

8. The invention of claim 5, wherein the transfer disc slightly overlaps the periphery of the slotted wheel.

9. The invention of claim 1, wherein the axis of the disc is inclined about 40° with respect to vertical.

* * * * *